United States Patent [19]
Brown

[11] Patent Number: 5,152,247
[45] Date of Patent: Oct. 6, 1992

[54] FEEDING TRAY FOR BIRDS AND METHOD

[76] Inventor: James S. Brown, 1183 4th St., Napa, Calif. 94558

[21] Appl. No.: 758,795

[22] Filed: Sep. 21, 1991

[51] Int. Cl.⁵ .............................................. A01K 31/00
[52] U.S. Cl. ......................................... 119/18; 119/63
[58] Field of Search ...................... 119/18, 57.8, 61, 63

[56] References Cited

U.S. PATENT DOCUMENTS

| | | | |
|---|---|---|---|
| 581,608 | 4/1897 | Neill | 119/63 |
| 1,869,901 | 8/1932 | Le Fever | 119/63 X |
| 1,900,868 | 3/1933 | Ritchie | 119/18 |
| 1,934,980 | 11/1933 | Hulland et al. | 119/63 |
| 2,659,345 | 11/1953 | Herbert | 119/61 |
| 3,361,116 | 1/1968 | Daniel et al. | 119/63 |
| 4,112,871 | 9/1978 | Newman | 119/63 X |

Primary Examiner—Robert P. Swiatek
Assistant Examiner—Nicholas D. Lucchesi
Attorney, Agent, or Firm—Harold D. Messner

[57] ABSTRACT

A feeding tray construction and method that prevents the escape of strong beaked birds during feeding comprises (i) a central stationary box closed along side and back panels, partially open at a top panel but fully open along its front entrance, (ii) an inverted drawer slidable within the central box, partially open or fully open along its top and bottom and closed along front, sides and back panels, and (iii) removable dishes or dish residing within the drawer.

19 Claims, 1 Drawing Sheet

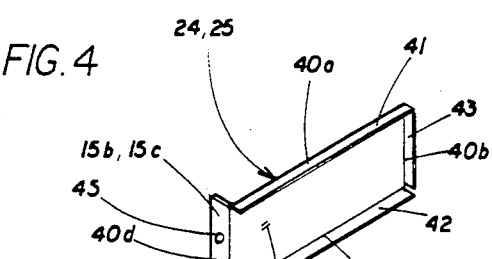
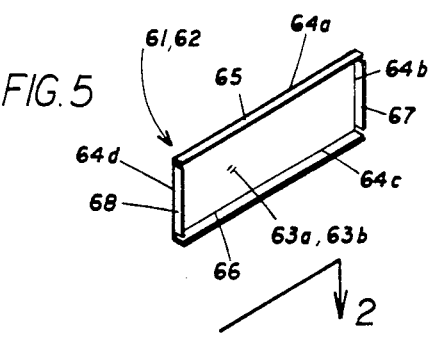
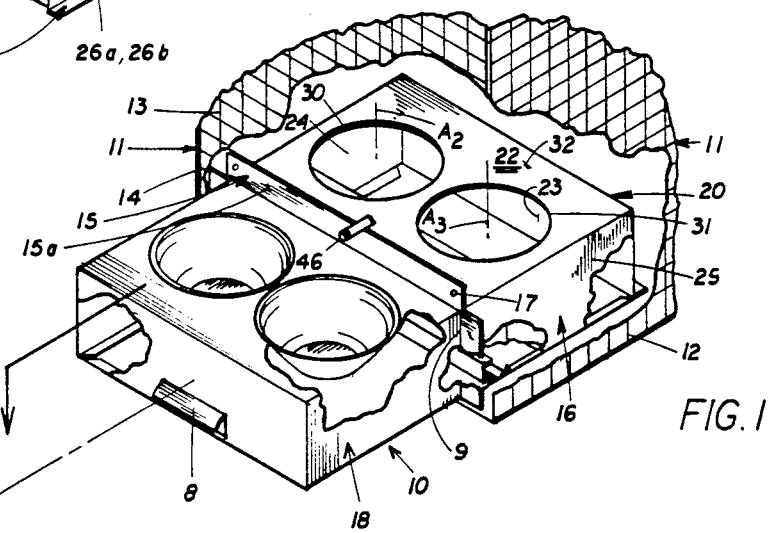
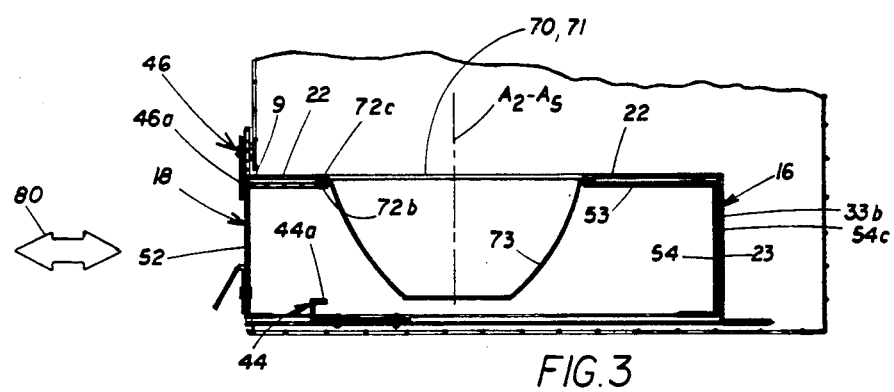
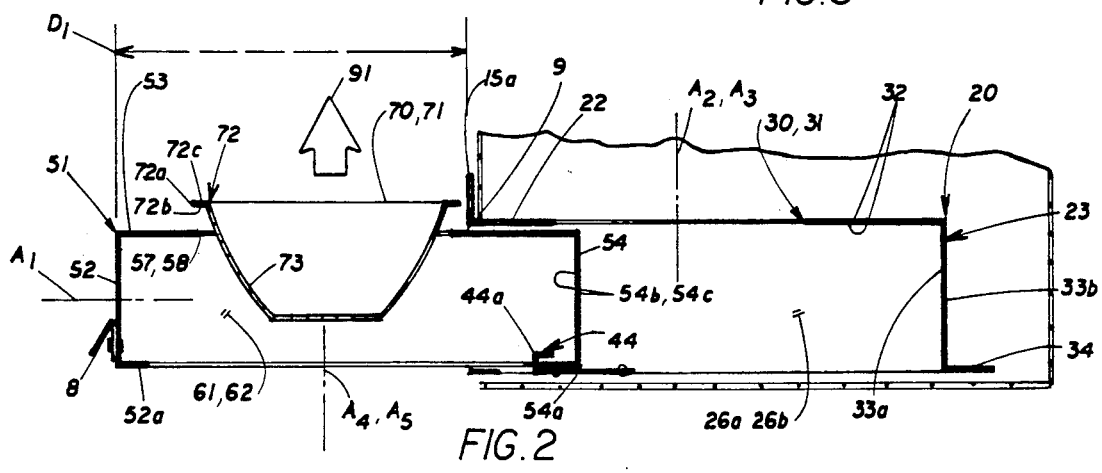

FEEDING TRAY FOR BIRDS AND METHOD

SCOPE OF THE INVENTION

This invention relates to feeding trays for exotic, strong beaked birds such as cockatoos and the like which both minimizes escape of such birds and prevents feed spillage during, after and before feeding periods, and more particularly to an improved feeding tray construction and method wherein elements comprising each tray can be stowed together at the fabrication site; then shipped off-site whereby shipping cost per unit is minimum; and finally attached to a user's flight cage in a relatively straight-forward manner.

BACKGROUND OF THE INVENTION

Importation of exotic birds in the united states has now been limited by law as well as by circumstances associated with destruction of the tropical forest of the world. Hence, many importers are turning to domestic breeders to maintain an adequate supply. However, in attempting to create a domestic breeding environment, especially one related to more expensive rare birds such as cockatoos, many breeders have found that their efforts are uneconomic. Often, expenses escalate because of several factors, inter alia, (i) the escape of birds when the cages are momentarily opened for feeding purposes, such tasks usually being performed by unsupervised personnel, (ii) the wasting of feed by upset or destruction of the feeding trays attached interior of the cage, such trays often being formed of plastic or the like and (iii) the requirement of shipping feeding trays off-site wherein bulk (not weight) unduly increases costs per unit.

SUMMARY OF THE INVENTION

The present invention relates to a feeding tray construction and method that prevents the escape of strong beaked exotic birds during feeding as well as prevents spillage of the feed via tray upsets. In one aspect, the tray comprises (i) a central stationary box closed along side and back panels, partially open at a top panel but fully open along its front entrance, (ii) an inverted drawer slidable within the central box, partially open or fully open along its top and bottom and closed along front, sides and back panels, and (iii) removable dishes or dish residing within the drawer. Features of the invention: (i) The box and drawer form a closed structure that prevents escape whether or not the drawer resides within or without the box; (ii) The termini of the side panels of the drawer are folded to form skids to facilitate movement; (iii) the maximum diameters of the openings in the top panels of the drawer and box are less than that of the dishes so that the edges of the dishes are wedged between the adjacent top panels and can not be upset by the birds during feeding; (iv) the degree of movement of the drawer is controlled (1) by having the back panels of the drawer and box be in broad surface contact after full inward movement of the drawer has occured, and (2) by providing a folded strut near the open entrance of the box having a L-shaped lip that receives an oppositely folded edge of the drawer to terminate outward movement of the drawer. Yet when the drawer is extended from the box, a sufficient portion of the drawer (exterior of the cage) permits the user to remove the dishes.

In another aspect, the feeding tray of the present invention is constructed of sheet metal and designed to have selected panels of the stationary box and inverted drawer be integrally formed as a Z-shaped or U-shaped subassembly using folding and crimping techniques. Then previously formed side panels are attached interior of complementary mating broad surfaces of such subassemblies by riveting methods to form structures of generally rectangular cross section. Such design further provides for advantages in packaging wherein the drawer can be stowed within the stationary box as a single unit and shipped off-site.

In detail, the method of the invention includes the steps of:

(1) prior to packaging, shipment and installation off-site, the fabricator constructs the designed drawer and stationary box individually and then assembles them as a single unit wherein bulk of the unit to be shipped, is minimum;

(2) such packaged assembly is then shipped off-site for further distribution or sale;

(3) at the user's off-site location, the user cuts away a portion of wall of his flight cage that matches the size and shape of the open entrance of the stationary box, slides the unitary drawer and box interior of the cage and then attaches the collar of the box to the wall of the cage adjacent to the cut-away portion using bolt-nut attaching means.

DESCRIPTION OF THE DRAWINGS

FIG. 1 is a perspective view of a conventional flight cage in which the feeding tray construction of the present invention is attached to a front wall, the feeding tray construction being partially cut-away to illustrate various constructional features;

FIG. 2 is a section of the feeding tray construction taken along line 2—2 of FIG. 1;

FIG. 3 is a section akin to FIG. 2 in which the drawer has undergone movement relative to the stationary box of the feeding tray construction of FIG. 1;

FIGS. 4 and 5 are detailed perspective views of the side panels, respectively, of the stationary box and drawer of the tray of FIG. 1.

DETAILED DESCRIPTION OF A PREFERRED EMBODIMENT

FIG. 1 shows feeding tray construction 10 attached to a flight cage 11. The flight cage 11 has large sized side walls 12 and a wide front wall 13 through which a rectangular shaped opening 14 has been cut. Into the rectangular opening 14 is positioned the feeding tray construction 10 of the present invention which provides escape-proof and anti-spillage features during feeding of any exotic birds within the flight cage 11 (not shown).

Briefly, the feeding tray construction 10 comprises a stationary box 16 having an open entrance 9 at one end that substantially matches the size and shape of the opening 14 of the cage 11. Into the open entrance 9 of the stationary box 16 is slidably fitted inverted drawer 18 having a tray pull 8 by which movement relative to the stationary box 16 occurs as explained below. An longitudinal axis of symmetry A1 bisects the open entrance 9 of the stationary box 16.

Attachment of the feeding tray 10 to the flight cage 11 is via a collar generally indicated at 15 formed by the stationary box 16 as discussed below. The collar 15 is seen to have a series of openings near its periphery through which bolt-nut-washer units 17 extend to attach the feeding tray 10 to the front wall 13 of the flight cage 11. Such attachment is of course closely adjacent to and abuts the opening 14 of teh flight cage 11.

The stationary box 16 is generally rectangular in cross section and comprises a separately formed, integral closure unit 20 and a pair of side panels 24, 25 attached to the closure unit 20. Such closure unit 20 also includes integrally formed collar segment 15a transverse to the opening 14 of the cage 11, a top panel 22 and a back panel 23. The separately constructed side panels 24, 25 attach to and extend from the back panel 23 and complete the stationary box 16.

In detail in FIG. 2, the top closure unit 20 is developed from a flat sheet of sheet metal and then bent along fold lines co-incident with intersection of the panels 22, 23 and collar 15a into a modified Z-shape that quickly and easily results in the formation of the collar segment 15a, top panel 22 and back panel 23 previously mentioned. Then the top panel 22 undergoes additional fabrication steps in which a pair of central openings 30, 31 are provided. Note that such openings 30, 31 each have an axis of symmetry A2 and A3 parallel to each other but normal to both the collar segment 15a and broad upper surface 32 of the top panel 22. The back panel 23 includes outer and inner broad flat surfaces 33a, 33b normal to the top panel 22 terminating in a downwardly folded edge or tab 34 normal to the flat surface 33a, 33b running the entire length of the back panel 23. The purpose of the folded edge 34 is to provide an longitudinally extending attaching surface that can receive another type of attaching means relative to the cage 11, if desired.

As shown in FIG. 4, each side panel 24, 25 includes outer and inner surfaces 26a, 26b. Each panel 24 or 25 is also formed from a flat sheet of sheet metal and then bent along fold lines at termini thereof. The orientation and function of the bends are different, however, from those used in the construction of closure unit 20.

Three of the bends are bent inwardly along fold lines 40a–40c to form upper and lower side edges 41, 42 and edge 43 that run the entire length of the adjacent side of the panels 24, 25. The purpose of lower side edges 42: to support strut 44 (see FIGS. 2 and 3) as well as form guideways indicated at 35 to aid movement of the inverted drawer 18 as explained below. The purpose of upper side edge 41: to abut the board surface 32 of the top panel 22 (FIG. 2) and permit rivet penetration (not shown) therethrough to form a continuous butt joint therebetween. The purpose of end edge 43: to abut the inner flat surface 33a of the back panel 23 and permit penetration of rivets (not shown) therethrough to form a continuous butt joint therebetween. Note that the strut 44 also includes an upwardly folded edge 44a running its full length.

The remaining bend is bent outwardly along fold line 40d to form collar segment 15b or 15c of the collar 15.

The collar segments 15a–15c of the collar 15 are provided with openings through which the bolt-nut-washer units 17 of FIG. 1, extend for attachment of the tray construction 10 relative to the flight cage 11 as previously mentioned. Central collar segment 15a also is provided with a latch 46 (FIGS. 1, 3) including a pivotable plastic arm 46a attached near the head of a bolt opposite to a nut (not shown). Such latch 46 is used to secure the drawer 18 relative to the stationary box when the drawer 18 is positioned interior of stationary box 16.

The inverted drawer 18 is generally rectangular in cross sections and includes an integrally formed closure unit 51, and a pair of side panels 61, 62.

The closure unit 51 consists of front panel 52, top panel 53 and back panel 54. The axis of symmetry A1 also bisects the front panel 52.

FIG. 2, the closure unit 51 is developed from a flat sheet of sheet metal and then bent along the fold lines intersecting the front, top and back panels 52–54 to form a modified U-shape that can quickly and easily result in the formation of the following: under flap 52a, front panel 52, top panel 53 and back panel 54, the latter including longitudinally extending edge 54a. The top panel 53 undergoes additional fabrication in which central openings 57, 58 are provided. Note that such openings 57, 58 have axes of symmetry A4 and A5 parallel to each other but normal to top panel 53 and axis of symmetry A1 of the tray. The back panel 54 is normal to the top panel 53, and includes outer and inner broad flat surfaces 54b, 54c as well as the folded edge 54a.

In FIG. 5, each side panel 61, 62 of the drawer 18 includes broad rectangular surfaces 63a, 63b. Each panel 61 or 62 is also formed from a flat sheet of sheet metal and then bent along fold lines 64a, 64b, 64c and 64d. The orientation and function of the bends are the same relative to each other.

All of the bends are bent inwardly along fold lines 64a–64d to form upper and lower side edges 65, 66 and end edges 67, 68 that run about and along the entire circumference of the side panel 61 or 62. The purpose of the upper and lower side edges 65, 66: to add rigidity to the side panels 61, 62, to abut the top panel 53 to receive rivets therethrough to form a continuous butt joint therebetween; at lower edge 66 to form skids that slide within the lower edges 42 (see FIG. 4) of the side panels 24, 25. The purpose of end edges 67, 68: to add rigidity to the side panels 61, 62 and to abut the inner surfaces the front and back panels 53, 54 and permit penetration of rivets (not shown) therethrough to form a continuous butt joint therebetween.

Dishes 70, 71 (FIG. 2) are metallic and fit within the openings 57, 58 of the top panel 53 of the drawer 18. Each dish 70, 71 includes a continuous collar 72 intragally connected to an upwardly concave cavity section 73 defining an axis of symmetry coincident with axes A4 and A5 of the openings 57, 58 of the top panel 53. The collar 72 comprises an end circumferentially extending surface 72a and lower and upper broad surfaces 72b, 72c. The broad surfaces 72b, 72c are normal to the axes of symmetry A4, A5. Note that the end circumferential surface 72a of each dish 70, 71 defines a maximum diameter that is greater than the diameters of the openings 30, 31 and 57, 58 of the top panels 22, 53 of the stationary box 16 and drawer 18, respectively. Hence, when the drawer 18 is fully extended within the stationary box 16 to define the feeding position of the invention (FIG. 3), the broad surfaces 72b, 72c of the dishes 70, 71 are wedged between the top panels 22, 53 of the box 16 and drawer 18, respectively and thus can not be displaced or upset by the birds during feeding. In addition, note that the broad surfaces 54c, 33a of the back panels 54, 23 of the drawer 18 and station box 16, respectively, are in terminating contact when the feeding position of the drawer 18 is attained.

OPERATIONS AND ASSEMBLY

The stationary box 16 and drawer 18 are constructed to form a completely closed structure to prevent escape of birds whether or not the drawer 18 resides within the stationary box 16 in the feeding position of the tray (FIG. 2) or extends from the stationary box 16 a distance D1 measured from the open entrance 9 of the stationary box 16 to define the service position of the drawer 18 (FIG. 2). Movement of the drawer 18 relative to the stationary box 16 is the direction of arrows 80 (FIG. 3). When the drawer 18 resides with the stationary box 16, note that the following occur: the drawer 18 and stationary box 16 are constructed so that their back panels 23, 54 are in broad surface contact after full inward movement of the drawer 18 relative to the box 16 has occurred; and the axes of symmetry A2-A5 of the openings 30, 31, 57 and 58 of the top panels 22 and 53 are coincident, with individual axes of symmetry of the concave cavity sections 73 of the dishes 70, 71, respectively. Hence the food for the birds previously loaded into the dishes 70, 71 are available for feeding. However, since the circumferential surface 72a of each dish 70, 71 defines a diameter that is greater than those of the openings 30, 31 and 57, 58, the broad surfaces 72b, 72c of the dishes 70, 71 cannot be dislodged from their broad sandwiching contact with the top panels 22, 53. Nor can the dishes 70, 71 be upset by the action of the birds during feeding.

When the drawer 18 is shifted outward from within the stationary box 16 (FIG. 2) to the service position of the drawer 18, note that lower side edges 66 of the side panels 61, 62 of FIG. 5 forms skids that rest upon and slide along the lower side edges 42 of the side panels 24, 25 of the stationary box 16 (FIG. 4). Such limited contact allows easy sliding action between the stationary box 16 and inverted drawer 18.

Such movement is terminated when the folded edge 54a of the back panel 54 of the drawer 18 makes nesting contact with folded edge 44a of the support strut 44 (see FIG. 2). The dishes 70, 71 can be removed in the direction of arrow 91 for cleaning, filling and the like.

Note that irrespective of the position of the drawer 18 relative to the stationary box, the caged birds within the flight cage 11 are sealed off and cannot escape. That is, when the drawer 18 resides completely within the stationary box 16 (FIG. 3), the front and side panels 52, 61, 62 of the drawer 18 seal with the top and side panels 22, 24, 25 of stationary box 16 to prevent escape through the open entrace 9 of the stationary box 16. But when the drawer 18 is withdrawn from the stationary box 16 (FIG. 2), the top, back and side panels 53, 54, 61, 62 of the drawer 18 again seal against to the top and side panels 22, 24, 25 of the stationary box 16. Even though openings 30, 31 of the stationary box 16 can be penetrated by the birds, the open entrance 9 of the stationary box 16 remains sealed.

In the manufacture and assembly of the invention, the feeding tray 10 is constructed of sheet mental and designed to have unitary panels of complementary mating shapes wherein the top and back panels 21, 22, 23 of the stationary box 16 and front, top and back panels 52, 53, 54 of the drawer 18 are each formed as a single modified Z-shaped or U-shaped subassembly by folding methods and then attached to separate fabricated side panels using riveting techniques. Such design further permits the drawer to be stowed within the stationary box as a single unit and shipped off-site.

In detail, the method of the invention includes the steps of:

(1) prior to packaging, shipment and assembly at the off-site location, the fabricator constructs the designed assembled drawer 18 and stationary box 16 individually and then packages them as a single assembly wherein bulk of the total package to be shipped, is minimum;

(2) such package assembly is then shipped to the off-site location for further distribution or sale;

(3) at the user's off-site location, the user cuts a portion of the flight cage 11 away that matches the size and shape of the open entrance 9 of the stationary box 16, slides the unitary drawer 18 and box 16 interior of the cage 1 and then attaches the collar 15 of the box 16 to the cage 11 adjacent to the cut-away portion using bolt-nut attaching means 17.

As to step (1), supra, the fabricator forms the top, back and side panels 21, 22, 24, 25 of the stationary box 16 and the front, top, back and side panels 52, 54, 61, 62 of the drawer 18 from single sheets of sheet metal using folding and crimping techniques wherein the formed Z-shaped or U-shaped subassemblies of the box 16 and drawer 17 form broad surfaces to receive the folded edges of the side panels 24, 25, 61, 62. The folds occur along the fold lines set forth above. The side panels 24, 25, 61, 62 are then riveted to the Z-shaped or U-shaped subassemblies as previously described. After the drawer 18 is inserted within the stationary box 16, the strut 44 is riveted to the lower tabs of the side panels 24, 25 of the stationary box 16.

In summary, the features of the invention include the following: (i) The stationary box 16 and drawer 18 are constructed to form a completely closed structure to prevent escape of birds via whether or not the drawer 18 resides within the stationary box 16 (FIG. 2) or without stationary box 16 (FIG. 3); (ii) The termini of the side panels 61, 62 of the inverted drawer 18 are inwardly folded to form skids to reside within the folded termini of the side panels 24, 25 of the stationary box 16 facilitate movement of the drawer 18 relative to the stationary box 16; (ii) the degree of movement of the drawer 18 into and from the stationary box 16 is controlled (1) by construction features so that the back panels 23, 54 of the stationary box 16 and drawer 18 are in broad surface contact after full inward movement of the drawer 18 relative to the box 16 and (2) by providing an inwardly folded strut 44 near the open entrance 9 of the stationary box 16 having an upwardly directed L-shaped edge 44a that received an oppositely folded edge 54a of the back panel 54 of the drawer 18 when the drawer 18 is fully extended from the stationary box 16 yet sufficient portion of the drawer 18 is exterior of the stationary box 16 to permit the user to remove the dishes 70, 71 for servicing. After the dishes 70, 71 are filled with bird feed and the drawer 18 inserted within the stationary box 16, note that the top panel 22 of the stationary box 16 is provided with openings 30, 31 of circular cross-section. These openings 30, 31 are alignable with the dishes 70, 71 in the drawer 18 through which the bird has access to the feed. Although the same openings 30, 31 will be open when the drawer 18 is withdrawn from the stationary box 16, the tray construction of the invention prevents escape by the birds because the back and side panels 54m 61, 62 of the drawer 18 seal off the open entrance 9 of the stationary box 16.

It is understood that various modifications and substitutions may be made in connection with the invention as described herein by those skilled in the art without departing from the spirit and scope of the following claims.

What is claimed is:

1. A combination bird cage and feeder for exotic birds, the combination comprising:

(i) a flight cage having a plurality of walls, at least one wall of said plurality of walls having an opening therein, (ii) a central stationary box of generally rectangular cross section attachable about said opening in said at least one wall of said plurality of walls of said flight cage and extending therein, said box including an open, transverse front entrance coincedent with said opening of said flight cage, said box also including a longitudinally extending top panel, a transverse back panel and pair of longitudinally extending side panels, (iii) a transverse strut means attached to said side panels of said stationary box and including a transverse L-shape edge positioned adjacent to said front entrance of said box in longitudinal alignment therewith, (iv) an inverted drawer also of generally rectangular cross section slidably fitting through said entrance of said central stationary box and positionable interior thereof to define a feeding position and a servicing position for said drawer, said drawer including a front panel coextensive of said front entrance of said stationary box, a top panel, a back panel and a pair of side panels, said back panel of said drawer including an inwardly folded edge in transverse, disconnectable connection with said L-shape edge of said strut means said drawer is positioned exterior of said box defining said service position, (v) at least a single feed dish slidably fitting within said top panel of said drawer whereby said box and said drawer form a completely closed structure in either said feeding or said service positions relative to said open entrance of said box.

2. The combination of claim 1 wherein said top panel of said box and said pair of side panels of said box include coextensive collar means outwardly foldable in attaching contact with said at least one wall of said plurality of walls of said flight cage adjacent to said front entrance and wherein said side panels of said box each includes a lower inwardly folded edge defining a guideway surface parallel to but offset from said top panel of said box.

3. The combination of claim 2 wherein said strut means is in longitudinal alignment with said guideway surfaces of said side panels of said box.

4. The combination of claim 2 in which said side panels of said inverted drawer each includes a lower folded edge defining a skid in slidable contact with said guideway surfaces of said side panels of said box to aid in providing easy movement of said drawer relative to said stationary box between said feeding and servicing positions.

5. The combination of claim 1 in which said top panels of said drawer and said box include broad, parallel surfaces each penetrated by at least a single opening alignable in a common working plane when said drawer is movably positioned relative to said stationary box defining said feeding position of said drawer relative to said box wherein feed in said dish in accessible to birds within said flight cage.

6. The combination of claim 5 in which said dish includes folded edge surfaces in contact with said broad surface of said top panel of said drawer and a concave cavity that resides interior of said inverted drawer whereby in said feeding position, said dish is alignable with said at least a single opening in the top panel of the stationary box so that feed within said cavity is accessible to birds but wherein said folded edge surfaces of said dish are sandwiched between said broad surfaces of said top panels of said drawer and said stationary box.

7. The combination of claim 6 in which said dish in contact with said broad surface of and carried by said top panel of said drawer is positioned exterior of said flight cage when said drawer is movably positioned relative to said stationary box to define said service position of said drawer relative to said box.

8. A tray for feeding exotic birds in a flight cage, comprising:

(i) a central stationary box of generally rectangular cross section including a longitudinal axis of symmetry bisecting an open, transverse front entrance thereof, a longitudinally extending top panel parallel to said longitudinal axis having an opening therethrough, a transverse back panel intersected by said axis and a pair of longitudinally extending side panels parallel to said axis, (ii) a transverse strut means attached to lower folded edges of said side panels of said stationary box and including a transverse L-shape edge positioned adjacent to said front entrance of said box, (iii) an inverted drawer slidably fitting through said entrance interior of said stationary box to define a feeding position and an exterior servicing position, said drawer including a front panel coextensive of said front entrance of said stationary box, a top panel, a back panel and a pair of side panels, said side panels of said drawer including a lower folded edge defining a skid in slidable contact with said side panels of said box for easy movement between said feeding and said servicing positions, said back panel of said drawer defining an inwardly folded edge that makes limiting contact with said L-shaped edge of said strut means at said service position of said drawer relative to said box, (iv) at least a single feed dish slidably fitting within an opening in said top panel of said drawer, whereby in said feeding position, said dish is alignable with said opening in the top panel of the stationary box so that feed within said dish is accessible to birds but wherein said box and said drawer form a completely closed structure in either said feeding or said service positions relative to said open entrance of said box.

9. The feeding tray of claim 8 wherein said top panel of said box and said pair of side panels of said box include coextensive collar means outwardly foldable relative to said axis adjacent to said front entrance.

10. The feeding tray of claim 8 in which movable contact between said skids of said drawer and said stationary box is further defined by forming side panels of said stationary box with inwardly folded edges relative to said axis of symmetry thereby defining a pair of guideways parallel to but offset from said axis of symmetry to slidably receive said skids of said drawer.

11. The feeding tray of claim 10 wherein said strut means is in transverse alignment with and intersecting said guideways of said side panels of said box and wherein said L-shaped edge has a transverse segment normal to and intersecting said guideways and a longitudinal segment a selected distance above said guideways to form a cavity to disconnectably receive said inwardly folded edge of said back panel of said drawer.

12. The feeding tray of claim 8 in which said top panel of said drawer includes broad, parallel surfaces each having at least a single opening alignable in a common working plane to receive said dish whereby when said drawer is movably positioned relative to said stationary box at said feeding position, feed in said dish is accessible to birds.

13. The feeding tray of claim 12 in which said dish includes folded edge surfaces in contact with said broad surface of said top panel of said drawer and a concave cavity that resides interior of said inverted drawer whereby in said feeding position, said dish is alignable with said opening in the top panel of the stationary box so that feed within said cavity is accessible to birds but wherein said folded edge surfaces of said dish are sandwiched between said top panels of said drawer and stationary box.

14. The feeding tray of claim 12 further including a flight cage having a plurality of walls, at least one wall of said plurality of walls having an opening therein through which said drawer and said central stationary box extend, and in which said dish in contact with said broad surface of and carried by said top panel of said drawer, is positioned exterior of said flight cage when said drawer is movably positioned relative to said stationary box at said service position.

15. Method of assembly of a feeding tray that includes:
   (i) a central stationary box of generally rectangular cross section attachable about an opening in a wall of a flight cage for exotic birds and extending therein, said box including an open, transverse front entrance coincident with said opening of said flight cage, said box also including a longitudinally extending top panel, a collar, a transverse back panel and a pair of longitudinally extending side panels,
   (ii) a transverse strut means attached to said side panels of said stationary box and including a transverse L-shape lip adjacent to said front entrance of said box in longitudinal alignment therewith,
   (iii) an inverted drawer also of generally rectangular cross section slidably fitting through said entrance of and positionable interior with respect to said stationary box at selected longitudinal distances relative to said entrance to define a feeding position and a servicing position for said drawer, said drawer including a front panel coextensive of said front entrance of said stationary box, a top panel, a back panel, and a pair of side panels, said back panel of said drawer including an inwardly folded edge in transverse, disconnectable connection with said L-shaped lip of said strut means when said drawer is at a selected distance defining said service position,
   (iv) at least a single feed dish slidably fitting within said top panel of said drawer whereby said box and said drawer form a completely closed structure in either said feeding or said service positions relative to said open entrance of said box, comprising the steps of:
   (1) prior to packaging, shipment and installation off-site, constructing the drawer and stationary box individually and then assembling them as a single unit wherein bulk of the unit to be shipped, is minimum;
   (2) shipping the packaged assembly off-site for further distribution or sale;
   (3) at a user's off-site location, cutting away a portion of a wall of a flight cage that matches the size and shape of the open entrance of the stationary box, sliding the single unit interior of the cage and then attaching the collar of the box to the wall of the cage adjacent to the cut-away portion using bolt and nut attaching means.

16. The method of claim 15 wherein step (1) includes the sub-steps of:
   (i) forming subassemblies of the drawer and stationary box and indivisual side panels by folding flat sheets of sheet metal along a series of fold lines,
   (ii) attaching the individual side panels to the formed subassemblies to form the drawer and stationary box, each of generally rectangular cross section,
   (iii) inserting the drawer interior of the stationary box using folded edges of the drawer as skids within folded edges of the side panels of the stationary box wherein the back panels of the stationary box and drawer are in broad surface contact after full inward movement of the drawer relative to the box to define the feeding position of the drawer relative to the stationary box, has occurred,
   (iv) attaching a strut between the lower folded edges of the side panels adjacent to the open entrance of the stationary box in which an upwardly folded edge intersects a folded edge of the back panel of the drawer to terminate outward movement of the drawer relative to the box and defines the servicing position of the drawer relative to the stationary box.

17. The method of claim 16 wherein the formed subassembly of the drawer is U-shaped and the formed subassembly of the stationary box is Z-shaped.

18. Method of feeding birds within a flight cage having
   (i) a central stationary box of generally rectangular cross section attachable about an opening in a wall of the flight cage and extending therein, said box including an open, transverse front entrance coincident with said opening of said flight cage, said box also including a longitudinally extending top panel, a transverse back panel and a pair of longitudinally extending side panels,
   (ii) a transverse strut means attached to said side panels of said stationary box and including a transverse L-shape lip adjacent to said entrance of said box in longitudinal alignment therewith,
   (iii) an inverted drawer also of generally rectangular cross section slidably fitting through said entrance of and positionable interior with respect to said stationary box at selected longitudinal distances relative to said entrance to define a feeding position and a servicing for said drawer, said drawer including a front panel coextensive of said front entrance of said stationary box, a top panel, a back panel and a pair of side panels, said back panel of said drawer including an inwardly folded edge in transverse, disconnectable connection with said L-shaped lip of said strut means when said drawer is at a distance defining said service position,
   (iv) at least said top panel of said drawer whereby said box and said drawer form a completely closed structure in either said feeding or said service positions relative to said open entrance of said box, comprising the steps of:
   (A) causing the drawer to undergo outward movement with respect to the stationary box wherein a sufficient portion of the drawer is exterior of the flight cage whereby the dish is positioned exterior of the flight cage in the service position, (B) inserting bird feed within the dish, (C) re-inserting the drawer within the stationary box until the dish is aligned with an opening in the top panel of the stationary box defining the feeding position of the drawer wherein the maximum diameters of the openings within the top panels of the drawer and box are less than that of the dish so that when the drawer fully resides within the stationary box, the edge of the dish becomes wedged between the top panels of the drawer and the box and thus can not be displaced or upset by the birds during feeding.

19. The method of claim 18 with the additional step of latching the drawer relative to the stationary box to stabilize the position of the drawer relative to the stationary box.

* * * * *